Oct. 17, 1933.　　　　　A. F. VICTOR　　　　　1,930,544
SOUND REPRODUCING DEVICE FOR MOVING PICTURES
Filed July 30, 1931　　　　6 Sheets-Sheet 1

Inventor:
ALEXANDER F. VICTOR

Oct. 17, 1933.  A. F. VICTOR  1,930,544
SOUND REPRODUCING DEVICE FOR MOVING PICTURES
Filed July 30, 1931  6 Sheets-Sheet 2

Inventor:
ALEXANDER F. VICTOR

Oct. 17, 1933.  A. F. VICTOR  1,930,544
SOUND REPRODUCING DEVICE FOR MOVING PICTURES
Filed July 30, 1931  6 Sheets-Sheet 3

Inventor:
ALEXANDER F. VICTOR

Oct. 17, 1933.  A. F. VICTOR  1,930,544
SOUND REPRODUCING DEVICE FOR MOVING PICTURES
Filed July 30, 1931    6 Sheets-Sheet 4

Inventor:
ALEXANDER F. VICTOR

Inventor:
ALEXANDER F. VICTOR

Oct. 17, 1933.  A. F. VICTOR  1,930,544
SOUND REPRODUCING DEVICE FOR MOVING PICTURES
Filed July 30, 1931    6 Sheets-Sheet 6
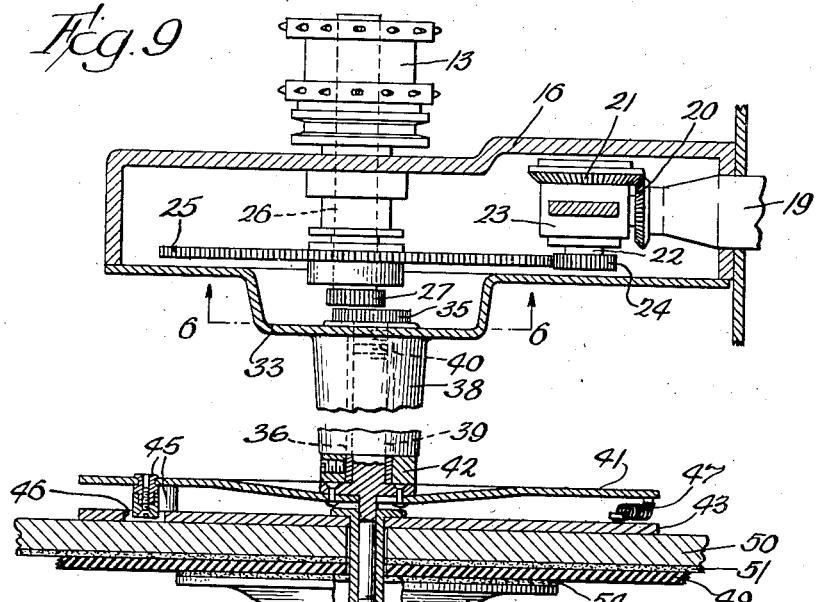
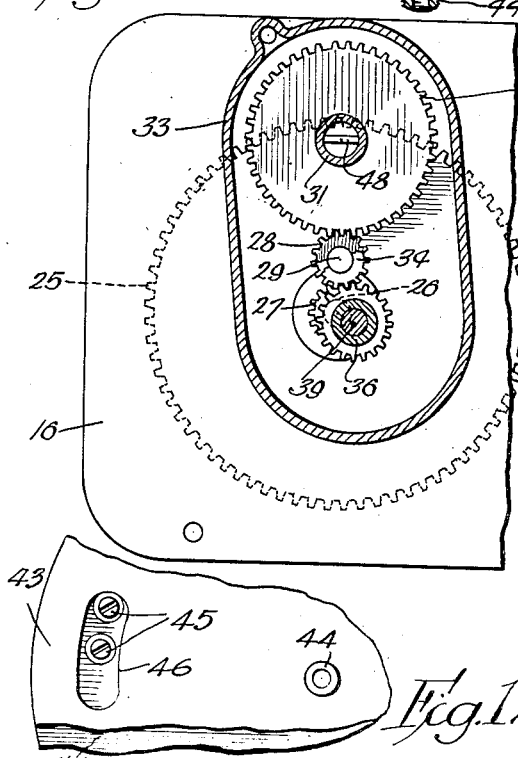
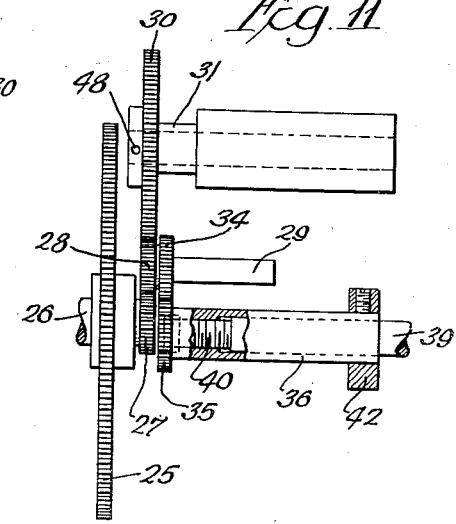
INVENTOR
ALEXANDER F. VICTOR
ATTY

UNITED STATES PATENT OFFICE 1,930,544

SOUND REPRODUCING DEVICE FOR MOVING PICTURES

Alexander Ferdinand Victor, New York, N. Y.

Application July 30, 1931. Serial No. 553,972

7 Claims. (Cl. 274—9)

My present invention relates to sound reproduction and it is more particularly directed to the mechanism employed to pick up and reproduce the sound wave recorded on a sound disk and to amplify and control the projection of the sound waves into the air. My invention relates to the employment of an electrically operated "pick-up" or reproducer in connection with a phonograph disk or sound record and the electrical amplification of the sound through a loud speaker.

The plate or turn table for the sound record is shown, in the present instance, as disposed in a vertical plane and rotated on a horizontal axis, and it is preferably actuated by the mechanism that moves the film in a motion picture projecting apparatus. The tone arm, is pivoted at one end and is positioned beside the sound record with electrically operated sound reproducer or "pick-up" on its outer end and provision is made to yieldably urge this structure towards the face of the phonograph record during operation. The arm is articulated at its pivot and its end portion beyond the fulcrum is provided with a weight that counterbalances the arm to permit ready and continuous engagement of the styles with the sound groove upon the phonograph record.

The apparatus herein disclosed is easy to assemble and may be readily operated by amateurs or persons unfamiliar with the projection and reproduction of so-called sound pictures or "talkies." The arrangement of the parts is extremely compact when assembled for use and the apparatus may be readily "knocked-down" and packed in a small carrying-case that is easy to handle. The parts of my apparatus are sturdy and they are thereby capable of withstanding hard usage.

Some of the objects of my invention reside in providing a sound reproducing apparatus that is novel in construction, economical to manufacture, dependable in operation, and capable of being readily attached to a motion picture projector so that the two devices may be sold as a unit. Other objects of my invention will be obvious to others after an understanding of the herein disclosed device is understood.

The accompanying drawings and the within description are given for the purpose of clearness of understanding only and no restrictions are to be understood therefrom. Reference will now be made to the accompanying drawings that form a part of this specification, in which, Figure 1 is a vertical side elevation of my sound reproducing and amplifying apparatus applied to a cinematographic projector and looking at the face of the phonograph disk.

Figure 8 is a schematic lay-out of the electric circuit used in the sound reproduction.

Figure 9 is a horizontal sectional view showing the mode of connecting the drive mechanism with the turntable.

Figure 10 is a vertical section on line 10—10 of of Figure 9 showing the gears.

Figure 11 is an edge elevation of the gearing shown in Figure 10.

Figure 12 is a detail fragmentary view of the turn-table mounting disks.

The drawings, it will be understood, are more or less schematic for the purpose of disclosing a typical or preferred form in which the apparatus may be made, and in said drawings the same reference characters are employed to designate like parts wherever they appear throughout the various views.

Figure 1:
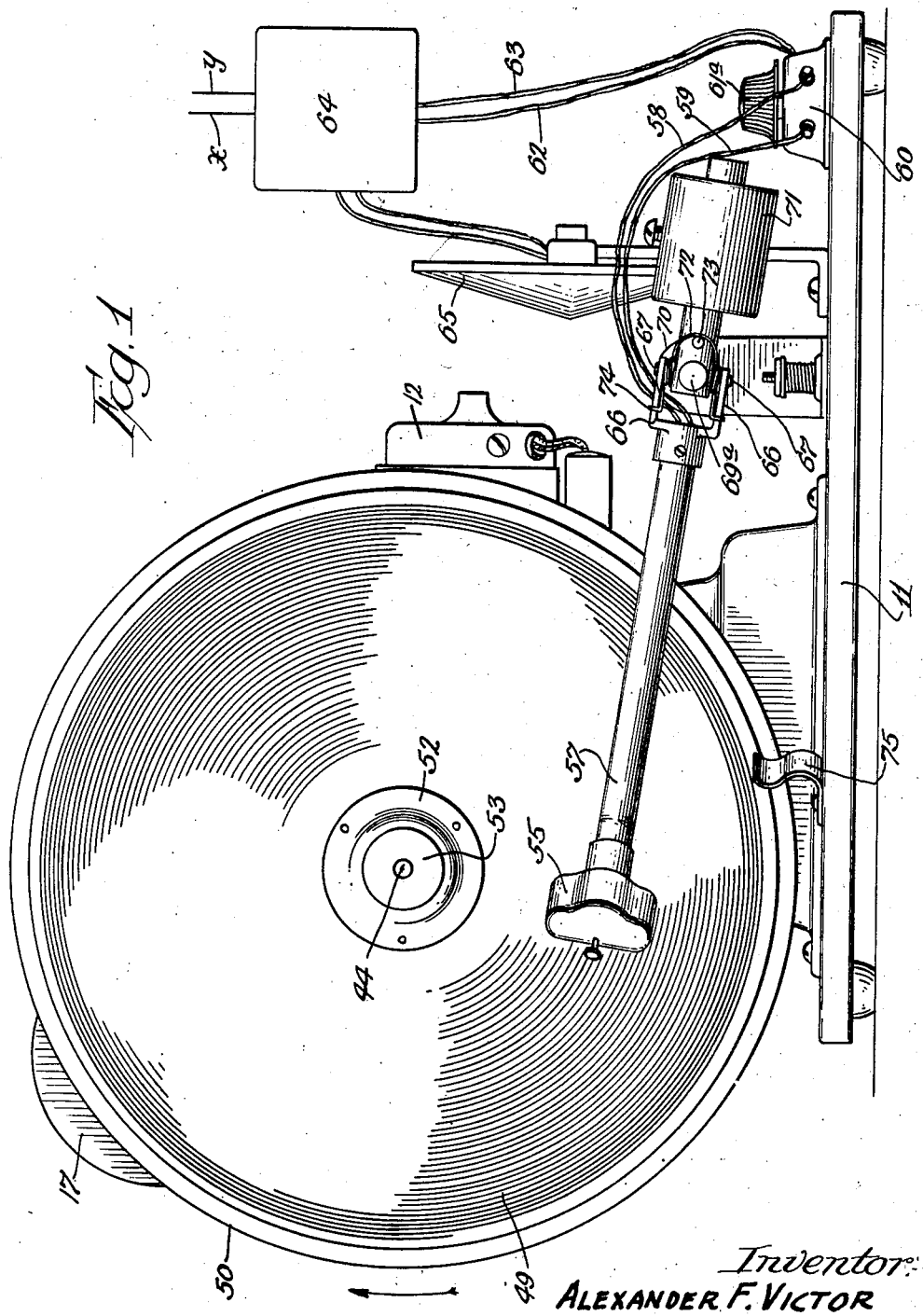
Figure 2:
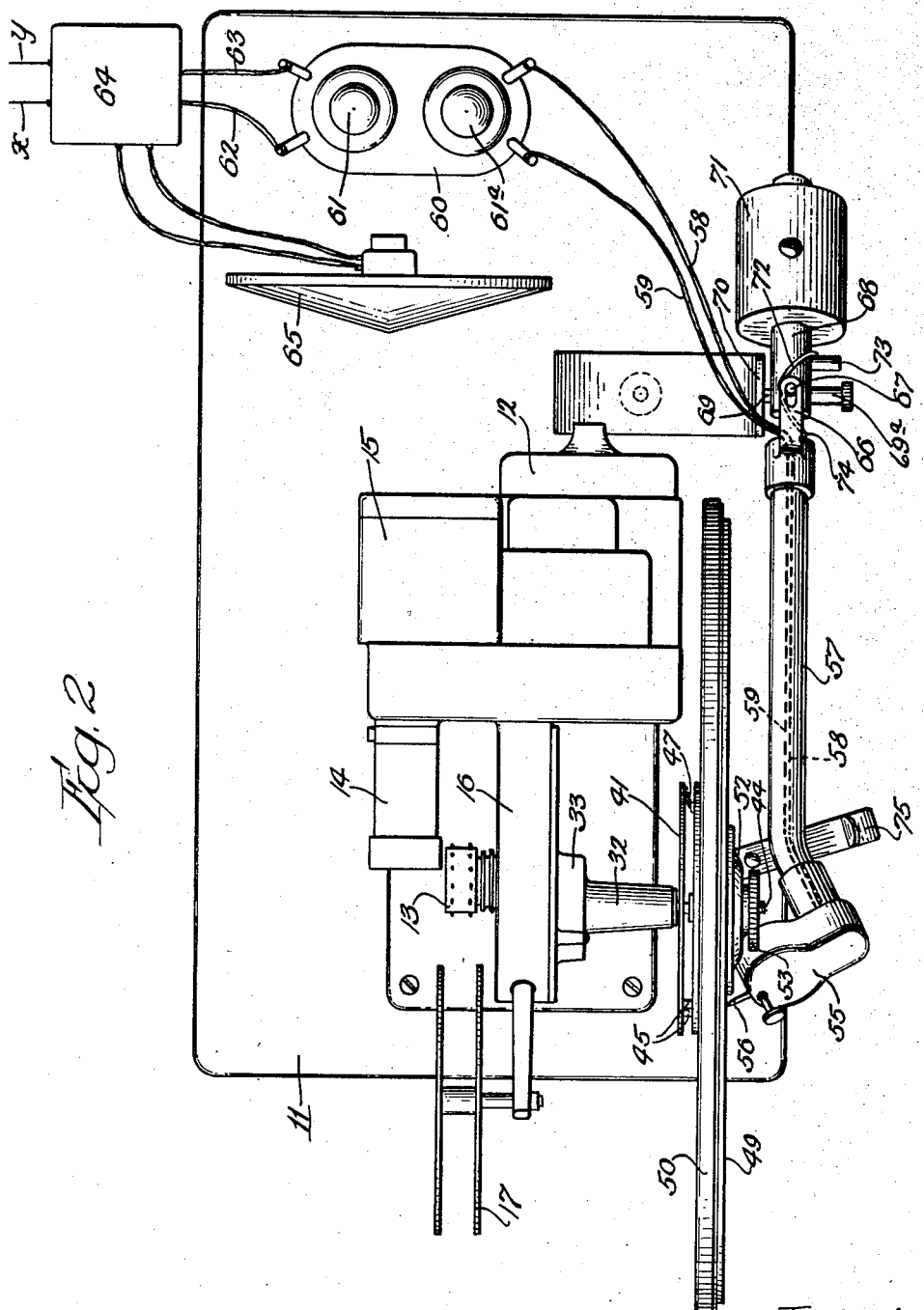
Figure 2 is a top plan of the structure disclosed in Figure 1.
Figure 3:
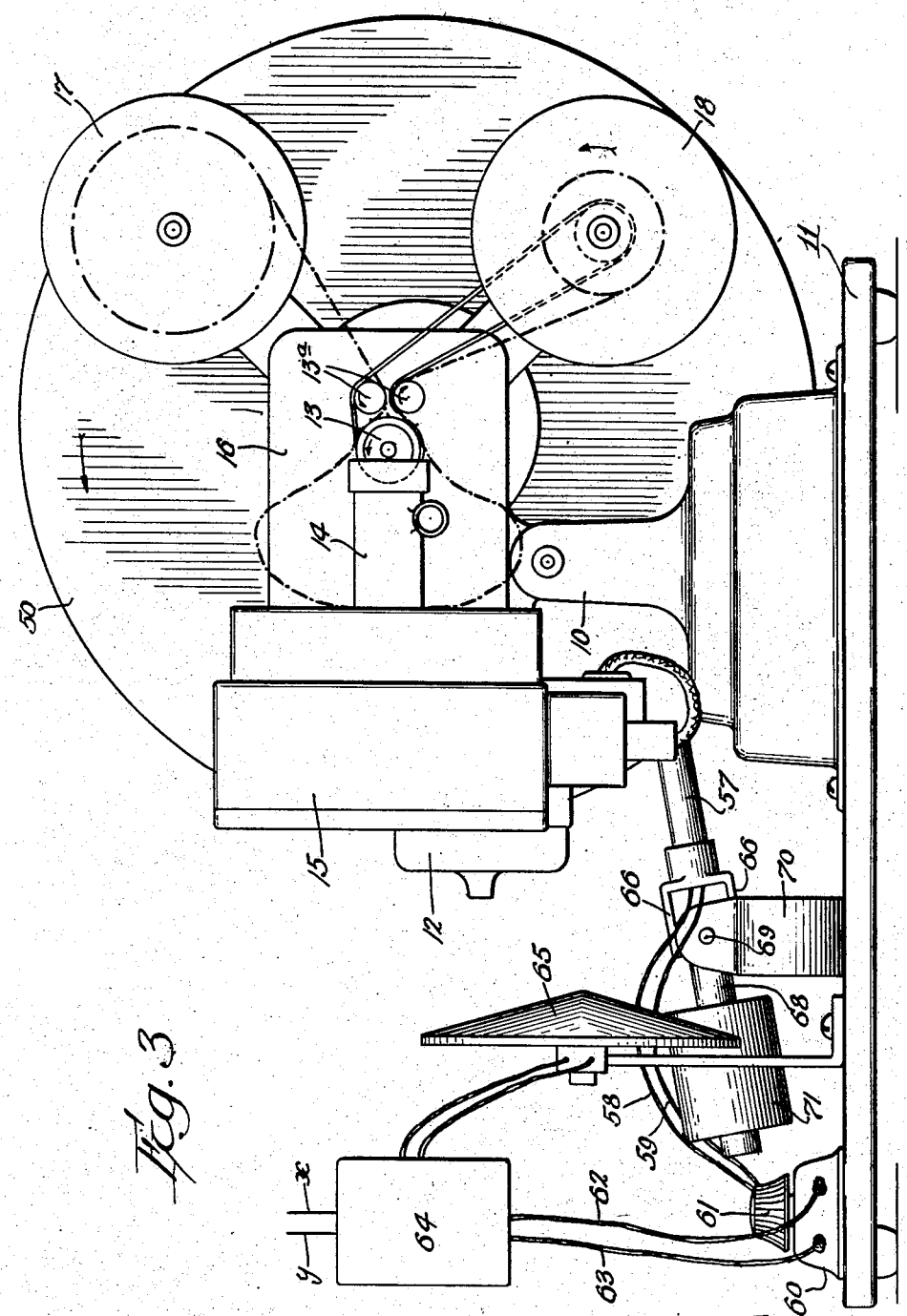
Figure 3 is a vertical elevation looking at the opposite side of the structure shown in Figure 1.
Figure 4:
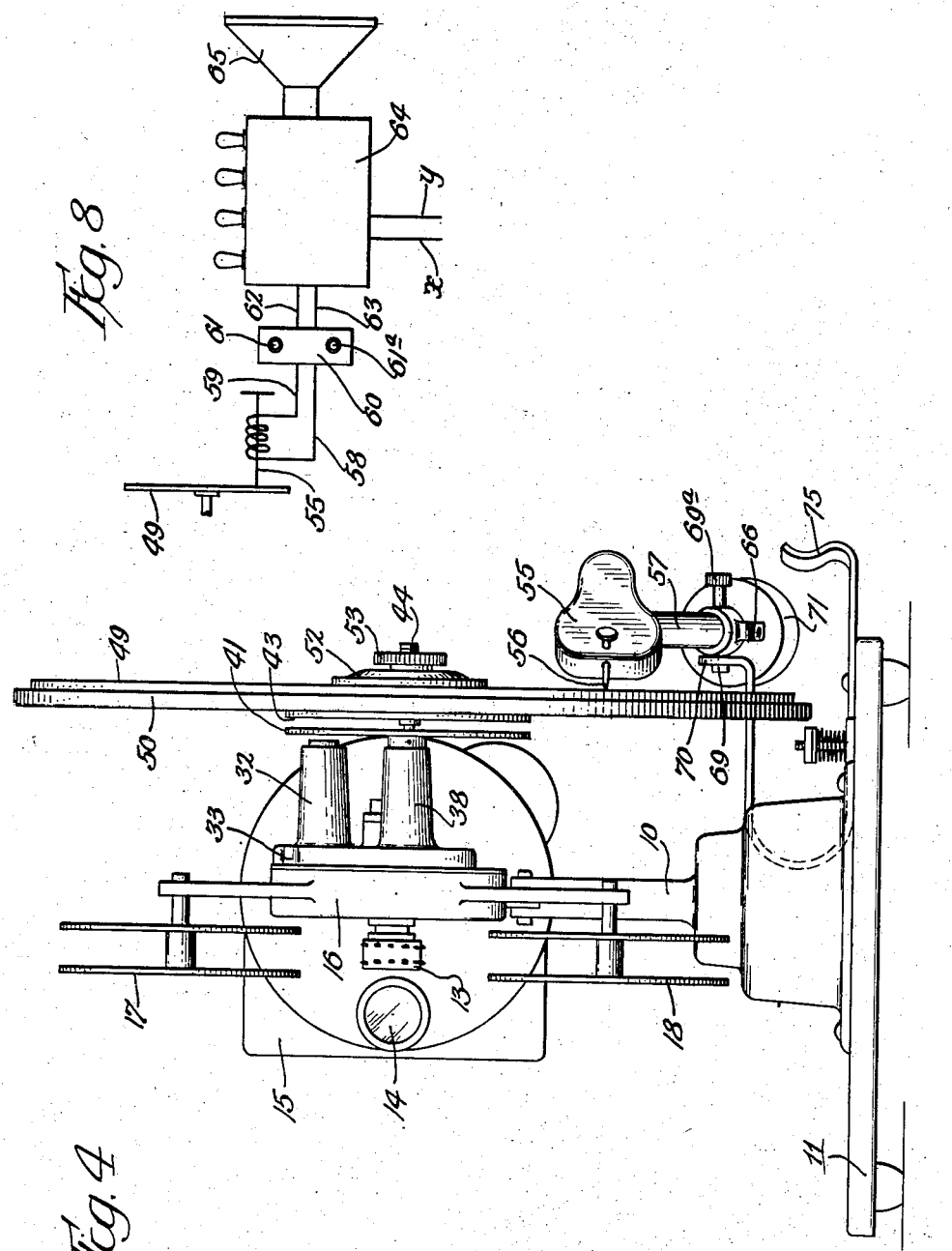
Figure 4 is a vertical end view looking at the apparatus from the left in Figure 2.
Figure 5:
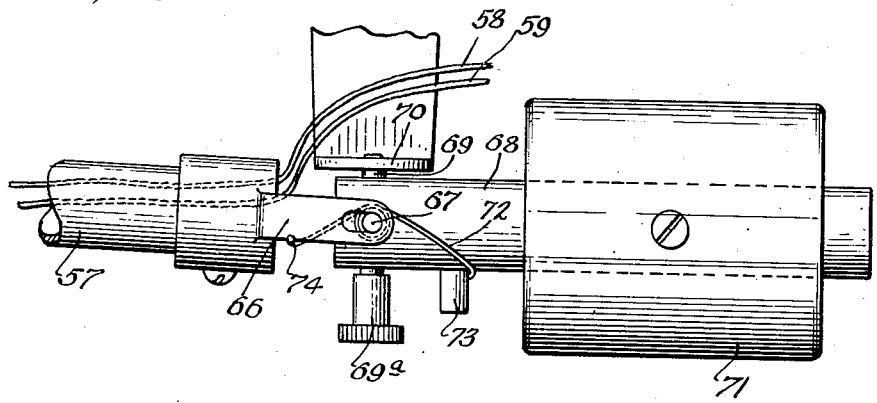
Figure 5 is a detail view of the articulated and fulcrumed portion of the tone arm, the view being in top plan and enlarged.
Figure 6:
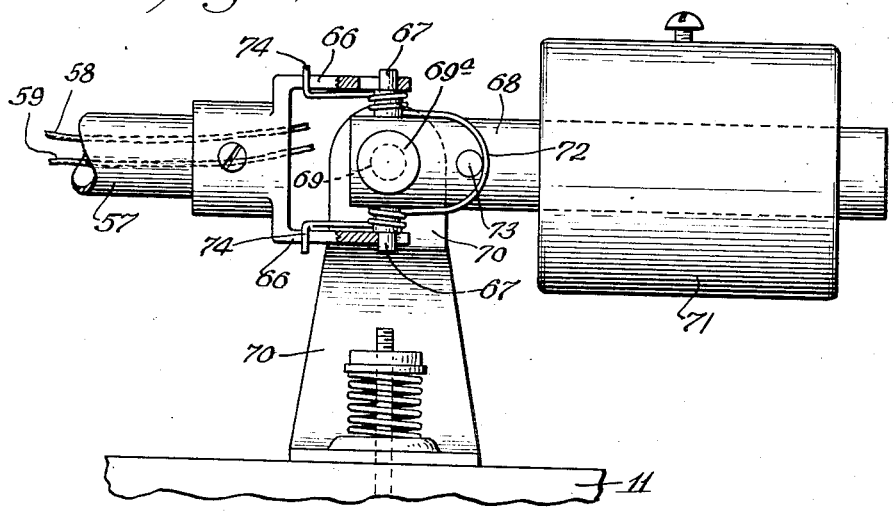
Figure 6 is a vertical side elevation of the parts illustrated in Figure 5.
Figure 7:
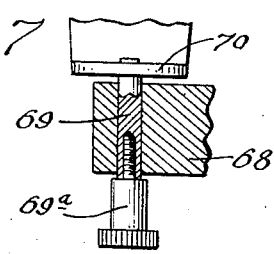
Figure 7 is a fragmental section showing the manner of pivotally mounting the tone arm.

In the drawings I have illustrated the structure in coordination with a cinematographic projector of a well known make. This projector preferably comprises an upright support or pedestal 10 secured to a flat base or platform 11, while on the top of the pedestal is an irregular shaped housing or casing containing the operating mechanism, lamp and other appurtenances of a motion picture projector. Included with this casing is the electric motor 12 that actuates the feed mechanism of which the film engaging sprocket 13 is a part and there is also a reciprocating mechanism and shuttle (not shown) within the housing for intermittently moving the film through a film passageway behind the projecting lens tube 14 during projection of the pictures. The lamp house 15 is an upright portion of the casing back of the projection lens tube and alongside the latter there is a rectangular shaped extension 16 of the main casing that projects laterally from the portion of the housing within which the intermittent feed mechanism and revolving shutter are enclosed.

The film is withdrawn from an upper spool 17 and passes downwardly to the upper segment of sprocket 13 from which it loops upwardly so as to pass vertically down into the film passageway immediately back of the lens tube 14, and after leaving the passageway the film forms an inverted loop and returns to the lower segment of sprocket 13, from whence it passes to the lower take-up spool 18 upon which it is wound. In moving to and from the sprocket 13 the film engages adjacent segments of idle rollers 13ª alongside the sprocket.

A main driven shaft 19 is actuated indirectly by the motor or drive shaft to which it may be connected by any suitable mechanism, and said main shaft 19 extends into the adjacent portion of the housing extension 16 where it is connected by beveled gears 20 and 21 to a transverse stub shaft 22 mounted in bearing 23. The ends of the stub shaft project beyond the bearing and one end carries the beveled gear 21 while the other end carries a pinion 24 that meshes with a large gear 25 mounted upon a horizontal spindle 26 that has bearings in a wall of the housing and passes through said wall where it is provided with a feed sprocket 13. Spindle 26 passes through the large gear 25 and carries a pinion 27 on its end that is in mesh with an idler 28 on a stud 29 and said idler meshes with a gear 30 on a horizontally disposed hollow shaft 31. This hollow shaft 31 has a bearing in a tapered hollow embossment 32 projecting laterally from a shallow oval shaped embossment 33 on the adjacent side wall of the housing extension 16 and opposite the sprocket.

A pinion 34 is secured to stud 29 alongside the idler 28 and meshes with a pinion 35 below the same and alongside the pinion 27. Pinion 35 is secured upon a tubular shaft or sleeve 36 having bearings in a tapered hollow embossment 38 projecting from the oval embossment 33 below and substantially in vertical alinement with the other embossment 32. The horizontal hollow shaft or sleeve 36 extends to the end of the bearing in embossment 38 and has its bore next the pinion 35 slightly reduced in diameter and is provided with internal threads.

The gearing above described is shown in Figures 9, 10 and 11 of the drawings. It will be understood that the film is intermittently moved past the projector tube by means of the feed mechanism that is actuated by the motor 12 and its associated parts; the sprocket 13 advances the film to the intermittent feed mechanism and also acts as the take-off to direct the film to the rewind spool 18; and the gear train 27, 28 and 30, and pinions 34 and 35, are actuated by the same mechanism that controls and feeds the film.

For the purpose of synchronizing the film feeding mechanism with the sound reproducing mechanism that I have devised, as well as to conveniently and effectively mount the film record disk in a vertical plane and rotate it upon a horizontal axis, I have provided a composite spindle structure consisting of a main portion and an extension. The main portion is in the form of a spindle 39 having a threaded end, designated as 40, that is inserted into the hollow shaft or sleeve 36 and screws into the threads in the inner end of the latter. A disk or circular plate 41 is secured to an intermediate portion of this spindle 39 in such position that when the spindle is screwed into the hollow shaft 36 said disk will abut a collar 42 secured to the outer portion of the hollow shaft. Alongside the disk 41 and spaced from it is a similarly shaped plate 43 carried by the internally threaded tubular extension 44 that is mounted upon the reduced and threaded outer portion of the main spindle 39. The relation of these plates is such that there may be a relative rotative movement between them.

To this end, plate 41 is provided with a pair of stops 45 that project laterally therefrom into a segmental slot 46 in the other plate 43, and a coiled contraction spring 47 is placed between the plates with its ends connected to the respective plates so as to yieldably maintain the plates in such positions that one of the stops 45 will normally engage an end of the slot 46 while the other will be at about the center of the slot. The circular plates 41 and 43 together with the spindle 39 and its extension 44 are in the form of a unitary structure that is readily removable as a whole from the cinematographic machine.

When producing sound and motion pictures together the structure remains the same as above described, but in order to produce silent pictures and to operate the mechanism manually by means of a crank, the disks and spindle 39 are removed and the crank, which has a slotted end, is inserted in the other or upper hollow shaft 31 so that the slot in the crank will interengage a cross-pin 48 in the inner portion of the sleeve shaft 31. During such operation the clutch, which connects the motor or drive shaft to shaft 19 is thrown out and gear 30, with pinions 28 and 27, will rotate large gear 19 which in turn will drive the reciprocating shuttle and other parts for projecting the pictures.

The turn-table for the sound record or disk consists of a large circular plate 50 that is mounted on the extension of the spindle and abuts against and frictionally engages the adjacent or outer disk 43, and a covering of felt 51 is placed on the outer face of the turn-table so that the record or sound disk 49 may be pressed against it. A spring clamp in the form of a bulged washer 52 is made integral with a hand nut 53 that is screwed onto the threaded end of spindle extension 44. The spring washer 52 has its central portion bulged away from the record disk and its face next to the record disk is provided with a covering of felt 54 to frictionally engage the surface of the disk without injury. When the hand nut is screwed tightly on the threaded spindle the record disk 49 and the turn-table 50 will be clamped in position against the disk 43 and thus all these parts are secured to the rotatable spindle in such manner that they may be revolved when the apparatus is in operation.

The turn-table plate 50 is preferably made of thick metal so that it possesses the characteristics of a balance wheel and will create a certain amount of momentum during its rotation and the operation of the apparatus. Because of the yielding relative movement between the two disks 41 and 43 any jar incident to the starting of the motor will be taken up and absorbed because the disk 41 may move suddenly forward, thus pulling on the spring 41 and causing a yieldable take-up of the heavy turn-table.

The turn-table and the record disk are disposed upon horizontal axes and the face of the record disk is therefore in vertical plane and upon the side of the projector opposite to the film, the film feeding mechanism, and projection tube. Also it will be seen the rotation of the turn-tablet and the record disk are coincident with the movement of the film when the latter is actuated by means of the sprocket and the intermittent feed mechanism through the intermediary of the gear train and motor. By placing suitable designations upon both the film ribbon and the record disk the places for starting the operation of the combined apparatus may be accurately indicated to the operator so that the sound reproduced from the record may be positively synchronized with the actions or movements of the objects in the picture thrown upon the screen by the projector.

In order to transform the undulations in the sound groove of the record disk into audible sound waves, an electro-magnet "pick-up" or reproducer box 55 is ovided, that has a preferably removable stylus 56. Box 55 is removably mounted upon the outer movable or swinging end of a hollow arm 57 which may be designated as a "tone arm". The sound reproducing box 55 may be of any of the well-known types of devices of this character that are purchasable on the market and it is preferred the mechanism shall be of the electro-magnetic type such as schematically shown in Figure 8. Conductor wires 58 and 59 lead from terminals within the box through the arm 57 and out of the same through the end thereof nearest the pivot and lead to terminals at a combined volume and tone control unit 60 mounted upon the base plate 11. The control unit 60 is provided with a rotatable button 61 that may be rotated in one direction or the other to increase or decrease the volume and has another button 61ª that is similarly manipulated to modify the tone. This control unit is electrically connected by conductors 62 and 63 to an amplifier unit 64 and the sound waves leave the latter through a dynamic speaker device 65, or other megaphone device. Electric current is supplied to the apparatus through lead conductors $x$ and $y$ that may be plugged into a service-tap in the usual manner.

The end of the tone arm 57 opposite the "pick-up" device is forked, and the fork arms 66 have alined apertures to receive radial trunnions 67 projecting respectively upwardly and downwardly from a pivoted and weighted bar 68 that provides articulated continuation of the tone arm. The bar 68 is fulcrumed upon a horizontal spindle 69 projecting laterally from the upstanding portion 70 of the L-shaped bracket that is secured to the adjacent portion of the base plate 11. The bar 68 is thus capable of up and down swinging movement and has a weight or counterbalance 71 adjustably secured to it so as to substantially equalize the weight of the hollow arm 57 and the sound pick-up 55. Thus the arm and box may be moved in an up and down direction with the bar 68 on pivot spindle 69, and in addition to this movement the tone arm is capable of a horizontal movement towards and away from the phonograph disk by reason of its articulated connection with the bar through the medium of the trunnions 67. A U-shaped spring 72 embraces a lateral pin 73 on the bar 68 and its members are coiled upon the trunnions 67, while the ends of said spring are bent laterally away from each other to provide hooks 74 that press against the fork arms 66 and yieldably urge the same and the pick-up box laterally or horizontally towards the rotatable sound record or disk 49. When the record has been played the tone arm is moved away from the same and placed behind the hook shaped end 75 of a stop secured to the base plate 11, after which the clamping washer and nut 52 and 53 are unscrewed and the record removed from the turntable 50 if it is desired to reproduce another record.

In the structure heretofore described it will be seen the record disk is disposed in a vertical plane, with its axis of rotation horizontal and opposite the film engaging sprocket 13, and the sound reproducer box and its arm are yieldably urged against the record disk in a horizontal direction, while the arm and box are counterbalanced by the bar and weight 68 and 71 and have articulated connection with said bar. This construction permits the reproducer or pick-up stylus 56 to engage the sound wave groove in the face of the vetrically disposed phonograph record 49 and to follow said groove continuously until the playing of the record has been completed and undulations in said record groove are taken up by the stylus and transformed into sound waves by the electrical elements which cause the sound waves to enter the air through the medium of the dynamic speaker 65. The sounds reproduced are thus under the control of the operator who may readily amplify or diminish the tone thereof by properly manipulating the buttons 61, 61ª on the control unit 60.

What I claim is:—

1. A sound reproducing apparatus comprising a rotatable sound disk, means for supporting and rotating said disk in an upright position, an elongated two-part arm having a portion disposed across the face of said disk, a sound pick-up device carried by said arm and normally engaged with said disk, an articulated joint connecting the parts of said arm, a counter-weight on the other portion of arm, and pivotal means for mounting said arm in cooperative relation to said disk, whereby the portion of said arm adjacent the disk is capable of universal movement.

2. A sound reproducing apparatus comprising a rotatable turn-table disposed in upright position, a sound record disk mounted on said turn-table, an elongated two-part arm mounted adjacent said turn-table and extending partly across said disk, a sound pick-up device carried by said arm and normally engaged with said disk, an articulated joint connecting the parts of said arm, a counter-weight on the other portion of said arm, and means for pivotally mounting the counter-weighted portion of said arm, whereby the other portion of said arm is capable of universal movement.

3. A sound reproducing apparatus comprising a rotatable turn-table disposed in upright position, a sound record disk mounted on said turn-table, an elongated member disposed across the face of said disk, a sound pick-up device carried by said member and normally engaged with said disk, an extension projecting from the end of said member opposite said pick-up device, a hinge connecting adjacent ends of said member and extension to permit movement of the member towards and from the disk, a horizontal pivot on which said member and extension are supported to permit up and down movement of said elements, and a counter-weight carried by said extension.

4. A sound reproducing apparatus comprising a rotatable turn-table disposed in upright position, a sound record disk mounted on said turn-table, an elongated member disposed across the face of said disk, a sound pick-up device carried by said member and normally engaged with said disk, an extension projecting from the end of said member opposite said pick-up device, a hinge connecting adjacent ends of said member and extension to permit movement of the member towards and from the disk, yieldable means urging said member normally towards said disk, a horizontal pivot on which said member and extension are supported to permit up and down movement of said elements, and a counter-weight carried by said extension.

5. A sound reproducing apparatus comprising a rotatable turn-table disposed in upright position, a sound record disk mounted on said turn-table, an elongated member disposed across the face of said disk, a sound pick-up device carried by said member and normally engaged with said disk, an extension projecting from the end of said member opposite said pick-up device, a hinge connecting adjacent ends of said member and extension to permit movement of the member towards and from the disk, yieldable means at the hinge of said member and extension for normally urging said member towards said disk, a horizontal pivot on which said member and extension are supported to permit up and down movement of said elements, and a counter-weight carried by said extension.

6. A sound reproducing apparatus comprising an actuating mechanism including a rotatable horizontal shaft, a turn-table disposed in upright position, means connecting said turn-table to said shaft, recoil mechanism associated with said means, a sound record disk mounted on said turn-table, an elongated arm mounted adjacent said turn-table and extended across said disk, devices for counterbalancing said arm and for normally urging said arm laterally towards said disk, and a sound pick-up device carried by said arm and normally engaged with said disk.

7. A sound reproducing apparatus comprising an actuating mechanism including a rotatable horizontal shaft, a turn-table disposed in upright position, means connecting said turn-table to said shaft consisting of a pair of side-by-side associated members, axially disposed cooperating spindles on the respective members, one spindle connected to said shaft and the other spindle entering said turn-table, recoil mechanism operatively connecting said associated members permitting independent relative movement between the respective members, a sound record disk mounted on said turn-table, a clamp device engaged with the spindle entering said turn-table, to maintain the record disk on the turn-table, and a sound pick-up device yieldably urged against said record disk.

ALEXANDER FERDINAND VICTOR.